United States Patent [19]

Diemer, Jr. et al.

[11] 4,056,371

[45] Nov. 1, 1977

[54] METHOD FOR SEPARATING IMMISCIBLE FLUIDS OF DIFFERENT DENSITY

[76] Inventors: R. Bertrum Diemer, Jr., 4942 Wilderness Road, Wilmington, N.C. 28401; James B. Dunson, Jr., 202 Winslow Road, Newark, Del. 19711

[21] Appl. No.: 660,181

[22] Filed: Feb. 23, 1976

[51] Int. Cl.$^2$ ............................................. B01D 47/00
[52] U.S. Cl. ............................................. 55/90; 55/1; 55/226; 55/257 R; 55/454; 55/462
[58] Field of Search ............... 55/1, 97, 90, 204, 205, 55/226, 257 R, 459, 454, 462; 210/512

[56] References Cited

U.S. PATENT DOCUMENTS

| 2,604,185 | 7/1952 | Johnstone et al. | 55/237 |
| 3,499,270 | 3/1970 | Paush | 55/459 R |
| 3,753,336 | 8/1973 | Drew et al. | 55/459 A |
| 3,946,650 | 3/1976 | Culpepper | 55/1 |

FOREIGN PATENT DOCUMENTS

| 254,816 | 10/1964 | Australia | 55/337 |

*Primary Examiner*—Bernard Nozick

[57] ABSTRACT

Efficient separations of immiscible fluids of different density can be obtained in compact separation systems by passing the fluid mixture through an inertial separator having an $N_D$ value of 50 or below under specified conditions of non-atomizing flow.

15 Claims, 6 Drawing Figures

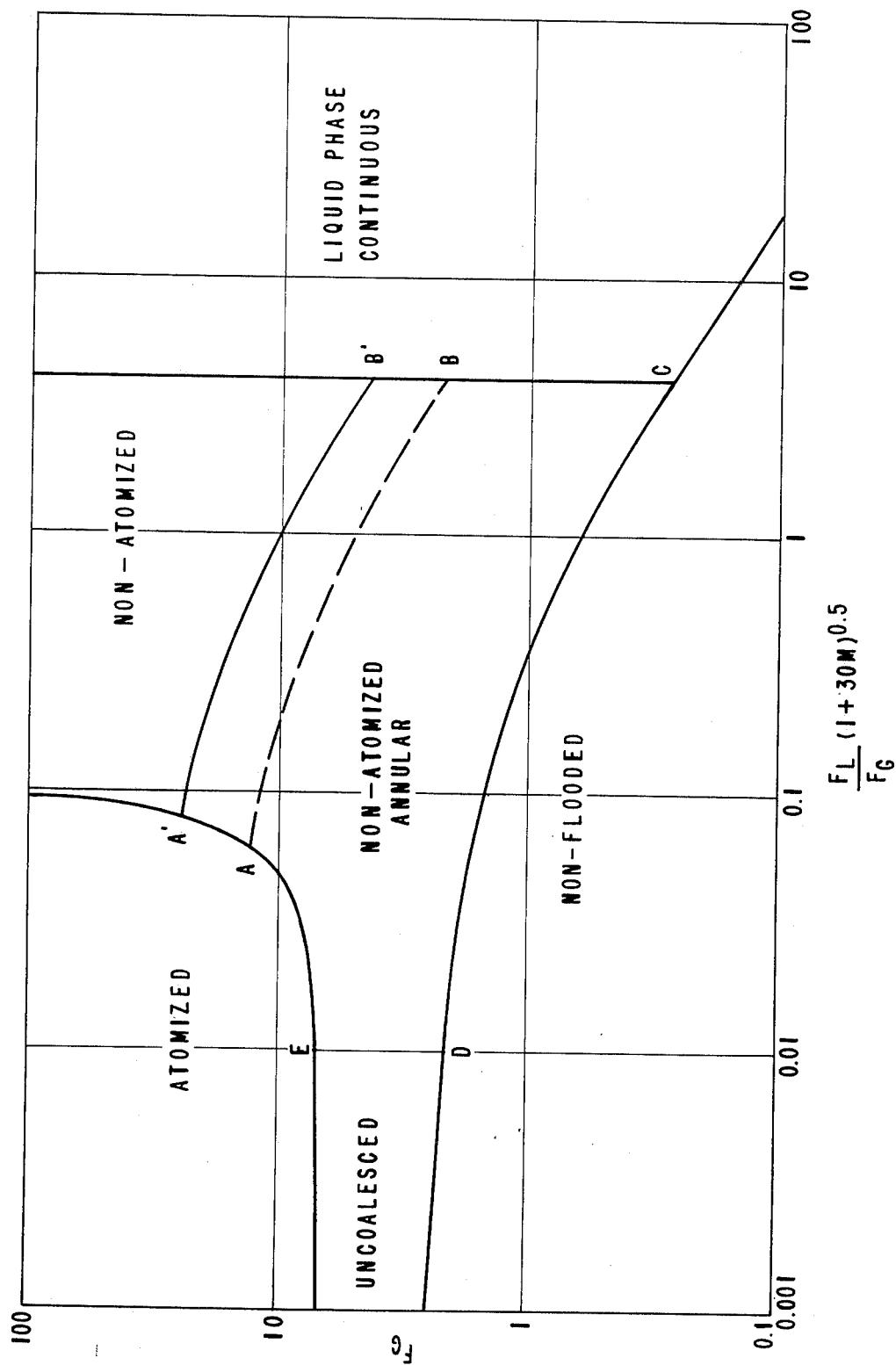

METHOD FOR SEPARATING IMMISCIBLE FLUIDS OF DIFFERENT DENSITY

BACKGROUND OF THE INVENTION

The efficient separation of fluids of different density is central to the efforts of industry to improve our environment by reducing the pollutants entering the atmosphere and to maintain the safety of working environments. Typical of such materials are such things as iron and steel furnace fumes and dust, ground limestone, carbon black, $H_2SO_4$ mists, pulverized coal, pigments, oil smoke, fly ash, foundry dust, alkali fumes, metallurgical fumes and dust, magnesium oxide smoke, zinc oxide fumes and the like.

Some of these can be separated by means of dry mechanical collectors such as a settling chamber, cyclone, fabric collector (bag filter) and electrostatic precipitator. Others must be separated by means of a wet scrubber such as a spray tower, packed tower, flooded mesh scrubber, reverse jet scrubber, wet cyclone, venturi or orifice scrubber.

Frequently, wet and dry collectors are combined, e.g., by (1) scrubbing gases containing a dispersion of either fluid or solid particulate matter with a liquid and then (2) separating the resulting dispersed liquid phase in an inertial separator, such as a cyclone or vane demister.

One important consideration in the design and use of separator systems is the physical space which is available for the system. For example, any machine mounted system for the removal of coal dust from the air at the face of a coal mine must be extremely compact in order to be able to fit on a conventional mining machine. Thus, countercurrent, non-atomizing scrubbers, because of their large space requirements, cannot be used in this application. On the other hand, compact co-current atomizing scrubbers with separators which would meet the limited space requirements tend to incur re-entrainment.

BRIEF DESCRIPTION OF THE INVENTION

The invention is therefore directed to a system for the separation of immiscible fluids of different density by which a quite high degree of efficiency can be obtained from small inertial separators.

In particular, the invention is directed to a method and apparatus for separating a mixture of immiscible fluids of different density in which a higher density fluid phase is dispersed within a lower density fluid phase comprising passing the mixture of fluids through an inertial separator having an $N_D$ value of 50 or below under specified conditions of non-atomizing flow.

More particularly, the invention is directed to a method for separating a flowing mixture of immiscible fluids of different density in which a higher density fluid phase is dispersed within a lower density fluid phase comprising passing the mixture through an inertial separator having an $N_D$ value of 50 or below under conditions of non-atomizing flow such that the Froude Coefficient of the fluid mixture at the separator inlet lies within the enclosed area defined by points A, B, C, D and E in FIG. 1 hereto.

DETAILED DESCRIPTION OF THE INVENTION

Figure 3A:
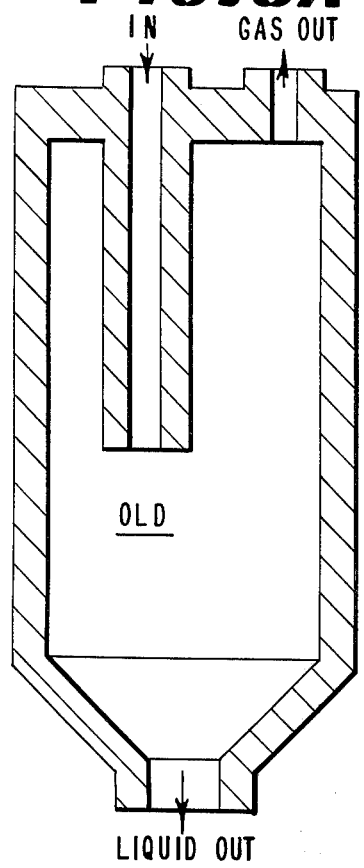

In accordance with the invention, it has been found that efficient separations of immiscible fluids can be obtained in compact separation systems by passing the fluid mixture under conditions of non-atomizing annular flow into an inertial separator having an $N_D$ value of 50 or below.

The invention will most often be used for separating mixtures in which the higher density fluid is a liquid and the lower density fluid is a gas. The invention can also be used for the removal of particulate solids contained in either the dispersed or continuous fluid phase. In certain instances, the particulates (whether solid or liquid) may be contained in the dry infulent gas, become wetted by the scrubbing liquid and then be removed by separation of the liquid and gaseous phases in the inertial separator. In other instances, particulates may be formed as a result of passage of a dry influent gas through a scrubber in which the particulates are formed by absorption, condensation due to heat transfer or chemical reaction with the scrubbing liquid and then dispersed within the liquid phase. The particulates are then removed by separation of the liquid and gaseous phases in the inertial separator. Thus, one criterion for the fluid systems which can be treated by the invention is that they be comprised of immiscible fluids of different density and that the flow to the separator be within the range of non-atomizing annular flow as defined hereinbelow. It is, however, preferred to employ fluid mixtures in which the ratio of the densities of the higher to the lower density fluid is at least about 2.

As used herein, the term "non-atomizing annular flow" refers to that region of flow enclosed within the area defined by points A, B, C, D and E of FIG. 1 hereto, which is a flow map which plots the dimensionless gas velocity through a duct versus the dimensionless liquid to gas ratio. Various other parameters may be contour plotted as a third dimension, such as flow regime, pressure drop, suspended liquid entrainment, entrained particle size distribution and so forth. It was, however, unexpectedly found that atomization within liquid-from-gas separators usually controlled their performance rather than flooding limitations. Thus, by design manipulations to minimize atomization both within the separator and within its feed duct, the potential capacity of various types of inertial separators can be substantially increased toward the flooding limit potential while still maintaining entrainment below 1,000 ppm by weight. The key parameters in the flow map are the gas and liquid Froude Coefficients (e.g., dimensionless velocities) and the property index (dimensionless combination of physical properties).

The various terms of this correlation are defined as follows:

$$F_L = \left[ \left( \frac{L}{\rho_L E} \right)^2 \frac{S}{E_g} \left( \frac{\rho_L}{\rho_L - \rho_G} \right) \right]^{0.5}$$

$$F_G = \left[ \left( \frac{G}{\rho_G E} \right)^2 \frac{S}{E_g} \left( \frac{\rho_G}{\rho_L - \rho_G} \right) \right]^{0.5},$$

wherein $\rho_G$ = density of lower density fluid (mass/length$^3$)
$\rho_L$ = density of higher density fluid (mass/length$^3$)
$G$ = mass flow rate of lower density fluid (mass/length$^2$·time)
$L$ = mass flow rate of higher density fluid (mass/length$^2$·time)
$E$ = void fraction of the conduit (length$^3$/length$^3$)

S = surface per unit volume (length$^2$/length$^3$)
g = local acceleration due to body force (length/time$^2$)

The property index-modified ratio of $F_L$ to $F_G$ is defined by the expression $$\frac{F_L}{F_G} (1 + 30 M)^{0.5},$$

wherein
$F_L$ and $F_G$ are defined as is given hereinabove.

$$M = \left[ \frac{\mu_L}{\delta \rho_L} \left( \frac{S}{E} \right) \right]^{0.5}$$

$\mu_L$ = viscosity of the higher density fluid (mass/length ·time), and
$\delta$ = surface tension of the higher density fluid (mass/time$^2$).

Unless expressly stated to the contrary, all Froude Coefficients herein are based upon an arbitrary entrainment threshold of 1,000 ppm by weight.

A further criterion of the fluid mixtures which may be separated in accordance with the invention is that they enter the separator in a state of non-atomized annular flow.

Those fluid mixtures which are not already in a state of non-atomized annular flow can be classified in three ways according to the nature of the dispersion:

1. streams to which higher density fluid must be added in order to place the higher density phase in non-atomized form;
2. streams from which higher density fluid must be removed in order to place the higher density phase in non-atomized form; and
3. streams which require mere coalescence of the higher density fluid in order to place the higher density phase in non-atomized form.

In the case of the first of the above three categories, it is frequently possible to add the requisite amount of liquid directly to the fluid conduit. However, the same function can also be carried out by passing the fluid through a non-atomizing scrubber. This type of operation is likely to arise when using the separator of the invention for removal of entrainment from a countercurrent contactor such as a spray tower.

In the case of the category requiring reduction of the liquid content of the fluid mixture, the reduction in liquid/gas ratio can be readily handled by means of a knockout chamber or trap of appropriate design to remove less than all the liquid. This situation is likely to arise when separating fluid mixtures from cocurrent heat exchangers such as partial evaporators or partial condensers.

For those streams requiring mere coalescence, simple mesh type coalescers may be used as well as non-atomizing scrubbers which would, of course, function merely as coalescers, not scrubbers. The situation in which the denser phase is dispersed in a non-equilibrium atomized form will arise mainly as a result of close coupling of the separator with an atomizing contactor such as an orifice scrubber.

Non-atomizing scrubbers, which normally operate within the range of annular flow, do not require prior atomization of the scrubbing liquid. Instead, such scrubbers utilize the turbulence of the flow to bring about intimate contact between the scrubbing medium and the lower density fluid (usually a gas). One preferred form of non-atomizing scrubber is the so-called "flooded mesh scrubber" disclosed in U.S. Pat. No. 3,370,401 to Lucas and Porter. In the flooded mesh scrubber, efficient contacting between the lower density fluid and the scrubbing medium is achieved by passing the gas cocurrently with the scrubbing medium through a fibrous bed at above the flooding velocity, i.e., within the regions of annular flow.

Another preferred form of non-atomizing scrubber is the so-called "reverse jet scrubber" disclosed in U.S. Pat. No. 3,803,805 to Low. In the reverse jet scrubber, efficient contacting between the lower density fluid and the scrubbing medium is achieved by passing the gas countercurrently to a non-atomized spray of liquid scrubbing medium and then cocurrently into a separator. Neither scrubber utilizes prior atomization of the scrubbing medium and both scrubbers utilize annular flow during normal operation.

An important advantage of the invention is that it is effective without respect to orientation. That is, it does not depend upon the direction of the local gravity vector with respect to the equipment axis. Thus, it can be used in a moving environment in which the device is pitching, rolling, yawing or bouncing. In fact, it can even be used in an environment of zero net acceleration due to gravity since differences in density requirement for separation (body force) can result from inertial as well as gravitational forces.

Separators which can be used in the method of the invention are inertial separators characterized as having Diemer Numbers ($N_D$) of 50 below. Wave-plate, impingement or centrifugal type separators can be used as well as combinations thereof.

The term "$N_D$" is a dimensionless number which is dependent upon the weight ratio of the higher density fluid to the lower density fluid and the geometry of the separator and is independent of both the throughput and inlet gas velocity. Thus, for a given fluid density ratio, the value of $N_D$ is constant whether the separator size is large and the pressure drop is low or the separator size is low and the pressure drop is high. $N_D$ is defined by the expression $$\frac{V}{Q_G^{1.5}} \left( \frac{\Delta P g_C}{\rho_G} \right)^{0.75},$$

wherein
V = internal volume of the separator (length$^3$)
$Q_G$ = throughput volume (length$^3$/time)
$\Delta P$ = pressure drop over the separator (force/length$^2$)
$g_C$ = force mass conversion constant (mass·length/force·time$^2$)
$\rho_G$ = density of lower density fluid phase (mass/length$^3$)

As used herein, the term "non-atomizing" refers to a condition in which the expected particle relaxation time is at least about $$0.16 \left[ \left( \frac{E}{S} \right) \frac{(\rho_L - \rho_G)}{g \rho_G} \right]^{0.5}$$

Particle relaxation time, which is equivalent to particle inertia relative to gas drag, is a measure of the rate at which a particle of higher density fluid responds to a change in the flow direction of the lower density fluid. By way of comparison, for ambient air and water, a particle relaxation time of 0.07 second corresponds to a particle size of about 150 micrometers.

Relaxation time is defined by the relationship $$\frac{(\rho_L - \rho_G) d^2}{18 \mu_G},$$

wherein $\rho_L$ = density of higher density fluid (mass/length$^3$)
$\mu_G$ = viscosity of lower density fluid (mass/length·time) and
$d$ = volume surface mean diameter of the higher density fluid (length) wherein $$d = \left[ \frac{0.5}{F_G} + 50M^{0.5} \left( \frac{F_L}{F_G} \right)^{1.5} \right] \frac{E}{S}$$

A still further criterion of the invention is that the fluid flow therein, which enters in a condition of non-atomized annular flow, not become atomized during its passage through the separator. Such atomization is not, however, a problem so long as the separator does not contain regions in which the relaxation time of the dispersed higher density phase is maintained at a level below the atomization threshold.

The invention is exemplified by the Examples, each of which refers to the Drawing, which consists of five figures, as follows:

FIG. 1 is a graphical correlation (flow map) in which various flow regimes are plotted as a function of the Froude Coefficient of the lower density phase and property index-modified ratio of the Froude Coefficients of the higher density fluid phase to the lower density fluid phase. (In the examples below, this abscissa value is for convenience referred to as X.)

Figure 3B:
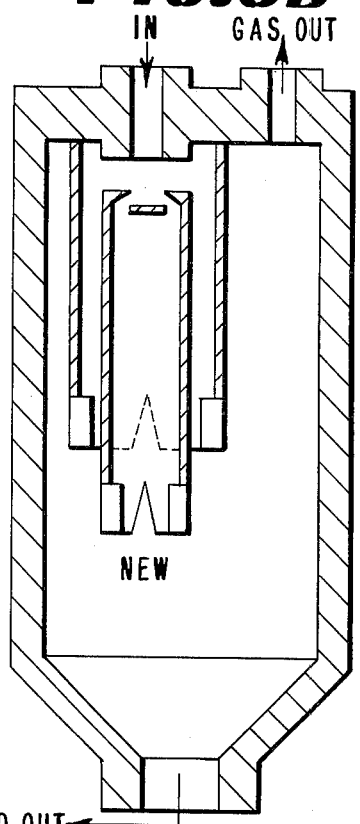
Figure 2:
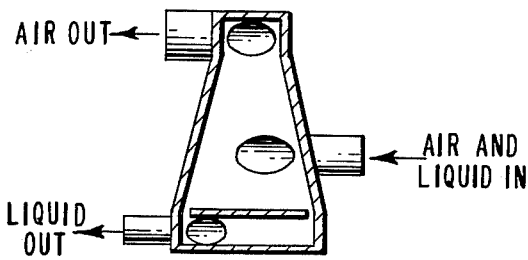
Figure 4:
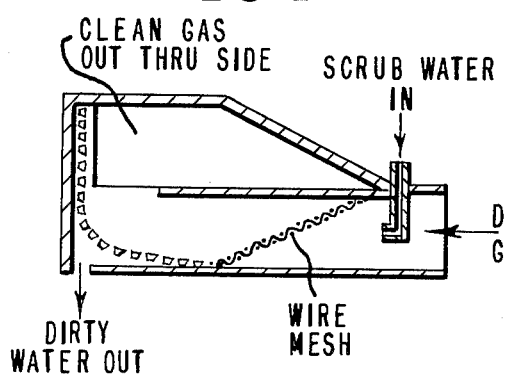
Figure 5:
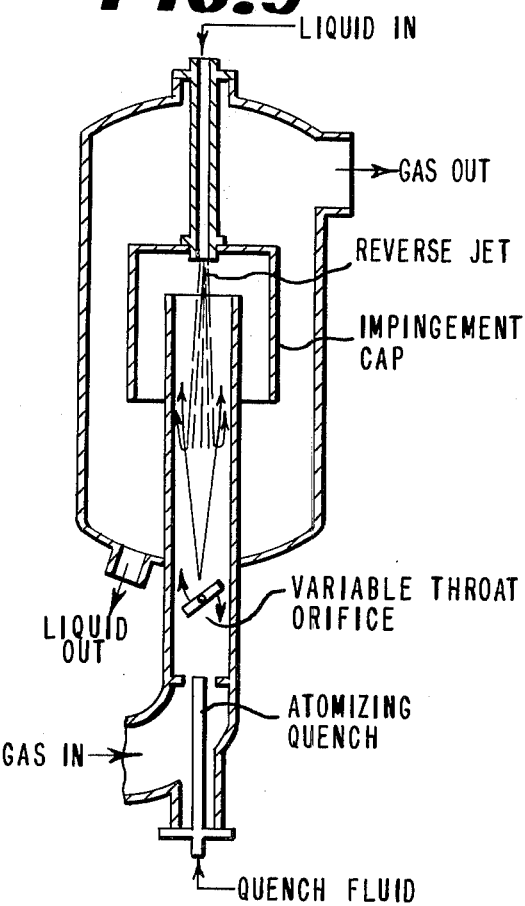

FIGS. 2-5 are cross sectional elevations of typical separator systems in which the method of the invention is used. In particular, FIG. 2 illustrates a centrifugal separator for the separation of liquids from compressed air; FIG. 3 illustrates a combined trap and impingement cap separator for removal of molten polymer entrained in vaporized solvent; FIG. 4 illustrates a scrubber/impingement separator for the removal of coal dust from air; and FIG. 5 illustrates a scrubber/impingement cap separator for the separation of metal halide vapors which HCl and HF-containing gas.

EXAMPLE I

As shown in FIG. 2, a centrifugal separator having a tapered cylindrical configuration is used to remove entrained solvent between the stages of a compressed air cleaning system such as those used on a submarine. The interstage air, which contains small amounts of solvent, enters tangentially at an intermediate point on the lateral surface of the separator. The air freed of liquid is discharged from a conduit atop the separator and the liquid is discharged from the bottom of the separation zone, via an annular drainage slot to a liquid collection zone from which it is discharged for recovery or other disposition.

The separator $N_D$ is about 40. The air normally contains about 0.3 gallon of solvent per 1000 cubic feet which results in an inlet Froude Coefficient ($F_G$) of only 6 (X = 0.0012) with a corresponding $F_G$ at the shell outlet of about 0.75. By addition of solvent to the air to a level of 15 gallons per 1000 cubic feet, the air is placed in a condition of non-atomized flow at an inlet Froude Coefficient of about 11 (X = 0.06) with a corresponding $F_G$ at the shell outlet of about 1.4. This results in doubling the gas handling capacity of the separator at constant entrainment. However, pressure drop over the separator is not significantly increased because of the improved fluid mechanics of the system.

EXAMPLE II

As shown in FIG. 3A, a thick-walled cylindrical vessel with a conical bottom is used to remove molten polymer and liquid coolant from a circulating stream of low density fluid discharged near its critical condition from a high pressure cocurrent direct contact condenser. The low density fluid containing entrained liquid enters the vessel through a conduit extending well within the open cylindrical portion of the vessel. Collected liquid is discharged from the bottom of the cone and the liquid-free gas is discharged from the top of the vessel.

The original separator $N_D$ is about 38,000. The low density fluid contains about 1200 gallons of liquid per 1,000 cubic feed which results in an inlet Froude Coefficient of about 68 (X = 5) and a corresponding $F_G$ value of about 0.12 at the shell outlet. By adding a target baffle and skimmer weir with a large drain and surrounding this rough separation system with a tubular baffle, much of the high density fluid phase is coalesced and removed. The main pressure shell then becomes a high efficiency secondary separator having an $N_D$ value of about 40. Conditions at the inlet to the secondary separator result in a Froude Coefficient of about 4 (X = 1), which is equivalent to an $F_G$ of about 1.2 at the final gas outlet from the shell. Allowing for the space taken by the added internals, the gas handling capacity of the system is increased by as much as seven times, depending upon the particular polymer molecular configuration. The modified separator is shown in FIG. 3B.

EXAMPLE III

As shown in FIG. 4, an impingement separator having a rectangular cross section is mounted on a continuous mining machine and used to remove coal dust from air exhausted from the area of the cutting head. Dust laden air and water are passed cocurrently into the separator just upstream of a knitted mesh pad through which the air is passed at above flooding velocity. The resulting liquid particles downstream of the mesh are removed through a profile bar skimmer and drained from the separator. The dustfree air undergoes three 90° turns and is discharged.

The separator $N_D$ is about 15. The air going through the mesh contains about 5 gallons of water per 1,000 cubic feet which results in an inlet Froude Coefficient of about 7 (X = 0.02). The gas handling capacity of the separator under these conditions of non-atomized flow is about five times as high as the capacity of the same separator when the dust is wetted with the same amount of water under atomizing conditions.

EXAMPLE IV

As shown in FIG. 5, an impingement cap is used to remove metal halide vapors from a scrubbed gas which also contains gaseous HCl and/or HF which is to be recovered for reuse. The gas containing acid vapors and metal halide vapors is scrubbed in an atomizing quench to provide a high generation rate of fresh surface area for absorption of the metal halide vapors and then passed through a variable throat orifice scrubber to provide a second stage mist contact. The mist-containing gas from the second stage scrubber is then passed through a reverse jet scrubber which functions in the manner of a coalescer to de-atomize the suspended liquid particles. From the reverse jet, the de-atomized flow is readily freed of entrained liquid by passing it through an annular impingement cap within a knockout chamber. The scrubbed gas is discharged from the upper part of the knockout chamber and the de-entrained liquid is discharged from the bottom of the knockout chamber.

The gas atomizing nozzle is used to produce a fog of liquid droplets having a size of no more than 50 micrometers (Relaxation time below 0.008 second) in which the net liquid to gas ratio is about 3 gallons per 1,000 cubic feet (X = 0.01). The orifice scrubber coalesces the initial fog to an average liquid particle size of 50-150 micrometers (Relaxation time 0.008-0.07 second). Without the addition of 12 gallons of water per 1,000 cubic feet or gas to effect de-atomization in the reverse jet scrubber, the capacity of the impingement cap and knockout chamber is only about 50% of the capacity of the system with non-atomized flow. The Froude Coefficients at the inlet of the impingement cap separator are 6 and 11 (X = 0.04) for operation with atomized and non-atomized flow respectively. The $N_D$ of the separator is about 45. The relaxation time of the dispersed liquid in the non-atomized flow state is above 0.07 second.

It will be recognized by those skilled in the art that the location of the boundaries of the regions in FIG. 1, other than the boundary of the atomizing region, are fixed within the usual scatter of two-phase flow data. On the other hand, the location of the boundary of the atomized region on the flow map is a function of the numerical value of M, the dimensionless property index, as is indicated above by the defining equations for relaxation time.

It will also be recognized that the term S/E as used herein is defined in a new and more general way than is customary.

$$S/E = (S/E)_p + 4/D_s + \left[ \frac{g(\rho_L - \rho_G)}{\delta} \right]^{0.5},$$

wherein $(S/E)_p$ = surface/volume ratio of any packing present (length$^2$/length$^3$) and $D_s$ is the superficial duct diameter (length).

We claim:

1. A method for separating a flowing mixture of immiscible fluids of different density in which a higher density fluid phase is dispersed within a lower density fluid phase comprising passing the mixture through an inertial separator having an $N_D$ value of 50 or below under conditions of non-atomizing flow such that the coordinates of the gas phase Froude coefficient and (1 + 30M)$^{0.5}$ times the ratio of the liquid phase Froude coefficient to the gas phase Froude coefficient of the fluid mixture at the separator inlet lie within the enclosed area defined by points A, B, C, D and E in FIG. 1 hereto.

2. The method of claim 1 in which the ratio of the density of the higher density phase to the lower density phase is at least about 2.

3. The method of claim 1 in which the mixture of immiscible fluids is comprised of more than one higher density fluid phase.

4. The method of claim 1 in which the higher density fluid phase contains particulate solids dispersed therein.

5. The method of claim 1 in which the higher density phase is atomized and the addition of higher density fluid to the mixture is required to place the higher density phase in non-atomized form.

6. The method of claim 5 in which addition of higher density fluid is accomplished by passing the mixture through a non-atomizing scrubber discharging into the inlet of the inertial separator.

7. The method of claim 6 in which the non-atomizing scrubber is a reverse-jet scrubber.

8. The method of claim 7 in which the lower density fluid phase contains particulate solids dispersed therein.

9. The method claim 8 in which the entrained particulate solids are coal dust.

10. The method of claim 6 in which the non-atomizing scrubber is a flooded mesh scrubber.

11. The method of claim 1 in which the higher density phase is atomized and the removal of higher density fluid from the mixture is required to place the higher density phase in non-atomized form.

12. The method of claim 11 in which removal of higher density fluid is accomplished by passing the mixture through a knockout trap, the less dense fluid outlet of which discharges into the inlet of the inertial separator.

13. The method of claim 1 in which the higher density phase is atomized and must be coalesced to place the higher density phase in non-atomized form.

14. The method of claim 13 in which the higher density phase is coalesced to non-atomized form by passing the mixture through a non-atomizing scrubber discharging into the inlet of the inertial separator.

15. The method of claim 14 in which the scrubbing medium is water and the lower density fluid is air.

* * * * *